United States Patent [19]
Cook et al.

[11] 3,731,121
[45] May 1, 1973

[54] COMMUTATOR AIR DEFLECTOR

[75] Inventors: William K. Cook, North East; Barry J. Turley, Wattsburg, both of Pa.

[73] Assignee: General Electric Company, Erie, Pa.

[22] Filed: Dec. 22, 1971

[21] Appl. No.: 211,001

[52] U.S. Cl. ................................. 310/227, 310/58
[51] Int. Cl. ............................................ H02k 9/28
[58] Field of Search .................. 310/52, 53, 58, 59, 310/60, 63, 227; 180/10; 415/115, 119

[56] References Cited

UNITED STATES PATENTS

| 2,436,654 | 2/1948 | Linville | 310/63 |
| 3,341,113 | 9/1967 | Sebok | 310/63 |
| 3,035,652 | 5/1962 | McLean | 180/10 |
| 3,648,086 | 3/1972 | Renner | 310/63 |
| 2,214,592 | 9/1940 | Mueller | 310/60 |
| 2,057,637 | 10/1936 | Schneider | 310/52 |

Primary Examiner—R. Skudy
Attorney—Walter C. Bernkopf et al.

[57] ABSTRACT

An air deflector for diverting the flow of forced air moving axially through a motor stator from the drive-end thereof, radially inwardly proximate the armature - commutator transistion point, to cause increased air flow directly over the commutator surface and thereby increase the heat transfer therefrom. Annular sections having concave surfaces toward the commutator are rigidly secured on the stator inner wall to provide the baffle effect.

10 Claims, 6 Drawing Figures

Patented May 1, 1973 3,731,121

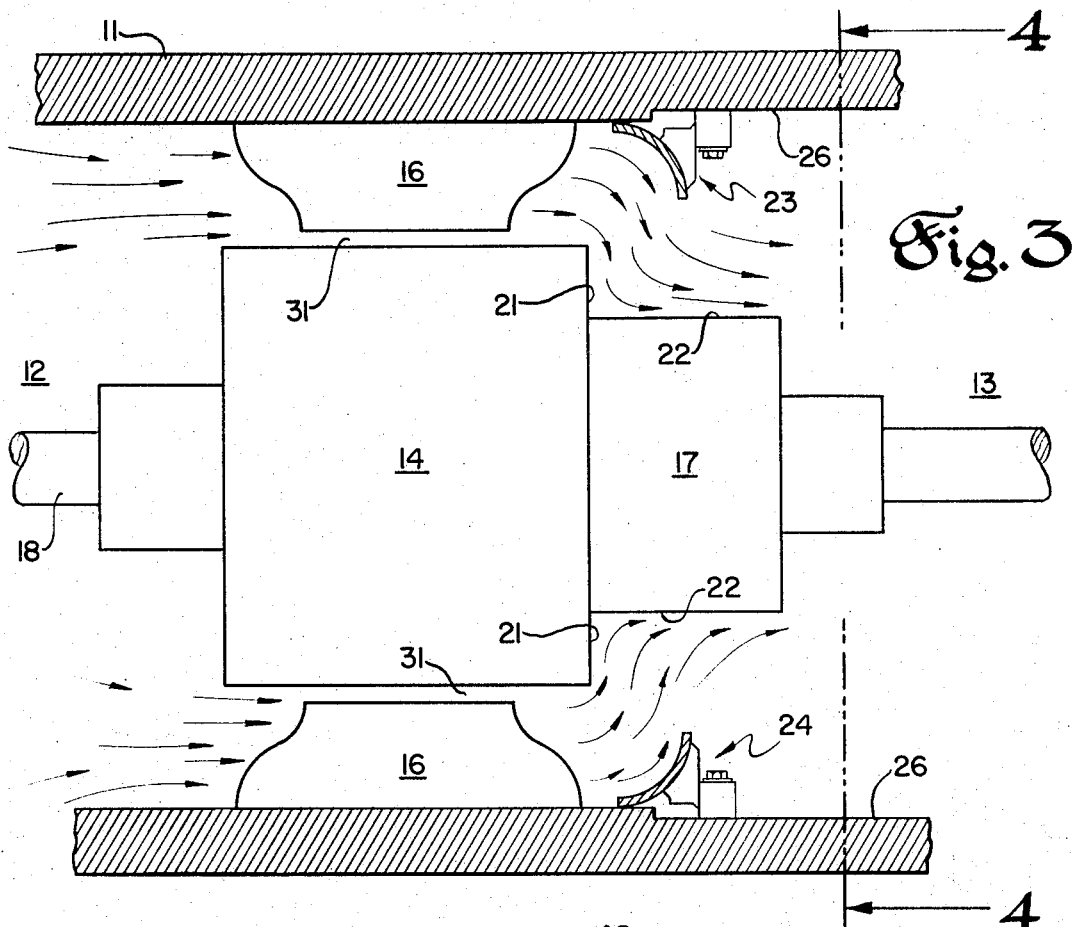
Fig. 3
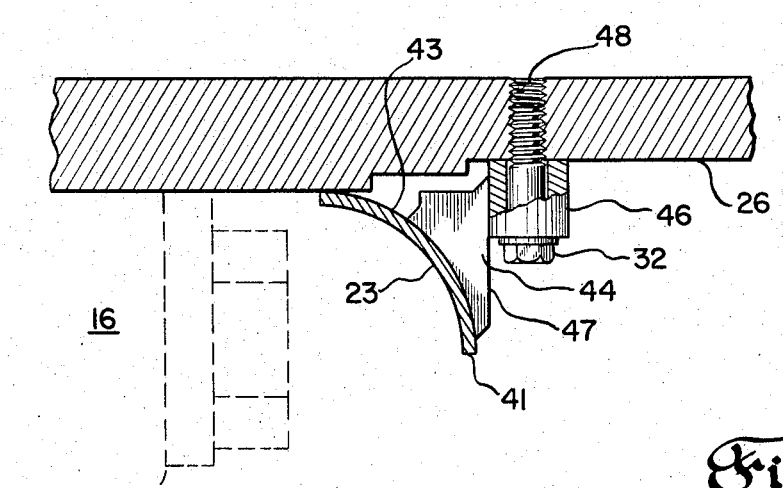
Fig. 5
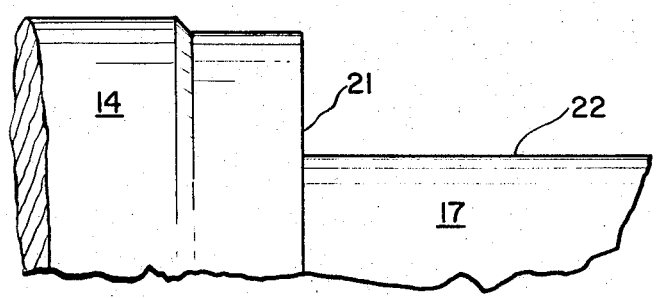

3,731,121

COMMUTATOR AIR DEFLECTION

BACKGROUND OF THE INVENTION

This invention relates generally to motor ventilation systems and more particularly to those wherein air is forced across the armature in a direction towards the commutator.

The dissipation of heat from an electrical machine has a marked effect on its heating and rating value. Preference is usually given to an open machine, i.e. one in which there is no restriction to ventilation other than that necessitated by good mechanical construction; but because of environment, a machine, and especially a DC motor, often requires some degree of enclosure. To prevent excessive reduction in the rating due to high temperatures a means of forced ventilation is often used to dissipate the heat from the motor. Fan blades installed on one or both ends of the armature is one means of providing self-ventilation to a motor, while connecting by means of a pipe or duct to a source of clean air provides one form of a separately ventilated machine.

Generally the air is made to flow axially over the commutator and risers and then over the armature windings which are of a greater diameter, to exit at the drive end of the motor. Such an arrangement provides for the relatively smooth flow of air over substantially the entire surfaces of the commutator and armature.

In some motor applications, however, the design and functional requirements are such that the air flow direction is reversed as can be seen in U.S. Pat. No. 2,899,005 issued to Howard J. McLean on May 22, 1962 and assigned to the assignee of this invention. The particular motor application of that invention and the general design concept to which the preferred embodiment of the subject invention relates is an electrically powered traction wheel wherein the magnet frame or stator of an electric motor is made cylindrical and the wheel is rotatably mounted on the motor magnet frame which serves as a non-rotating axle for the wheel. The magnet frame has at one end affixed thereto or integral therewith a mounting flange by means of which it may be secured to a vehicle body.

The unusual manner in which the motor is mounted and forms the hub of the wheel does not allow use of conventional methods of introducing air to the motor for ventilating thereof. Maintenance and accessibility of the motor, particularly the current collector assembly and mechanical brakes, is best facilitated by placing them on the outboard side of the wheel. However, due to the semi-enclosed nature of the machine it is desirable to provide a forced ventilation system which is most conveniently applied from the inboard side of the wheel. The air flow path of such an arrangement passes axially through the motor, between the stator and the armature surface, over the commutator portion of the rotor, and out an opening in the outboard side of the wheel. When the air current reaches the commutator risers, the sudden step down to the smaller diameter commutator causes a disruption of air flow and prevents the air from passing in contiguous relationship with the commutator surface. The low pressure area which is created causes a decrease in air flow velocity and heat dissipation. Heat caused by brush friction, contact resistance losses and other factors is absorbed rather than being dissipated and the commutator temperatures increase to lower the rating of the motor.

It is therefore an object of this invention to provide an improved ventilation arrangement for a DC motor.

Another object of this invention is the provision for better dissipation of heat from the commutator surface of a DC motor.

Yet another object of this invention is the provision for increasing the rating of a DC motor by the modification of a present design.

A further object of this invention is the provision for an economical and functional forced ventilation system for a motor, wherein the air movement is across the armature in a direction toward the commutator.

These objects and other features and advantages become more readily apparent upon reference to the following description when taken in conjunction with the appended drawings.

SUMMARY OF THE INVENTION

This invention employs a baffle arrangement to obtain more effective cooling of the commutator portion of a DC motor. Annular sections of a concave deflector are secured to the inner wall of the stator at an axial position surrounding the riser portion of the rotor. Air currents traveling axially across the armature surface are deflected by the concave baffle surface toward the commutator to provide increased air velocity thereover and thereby increase the heat dissipation therefrom and the motor rating thereof.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 3 is a schematic view of a motor having an installed baffle in accordance with the preferred embodiment of the invention.

FIG. 5 is a sectional view of the baffle portion as seen along lines 5—5 of FIG. 4.

DESCRIPTION OF THE PREFERRED EMBODIMENT

Figure 1:
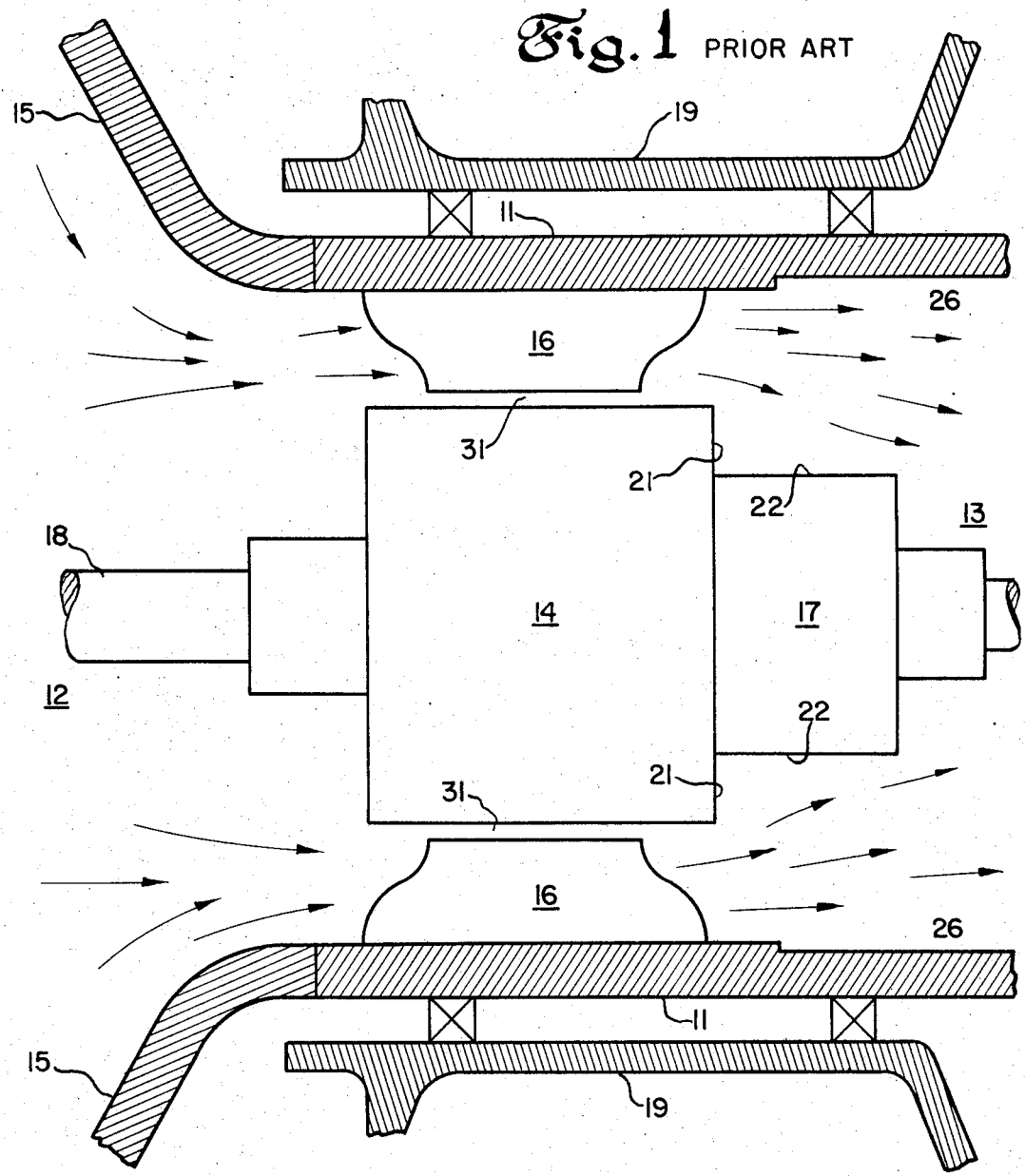
FIG. 1 is a schematic illustration of the ventilation air flow as it occurs in machines of the prior art.

FIG. 1 illustrates a motor 10 having a ventilation arrangement wherein the cooling is accomplished by forcing air axially through the stator 11, from the drive end 12 of the motor towards the commutator end 13 thereof. The air flow (indicated by the arrows) moves over the surface of the armature 14 around the stator coils 16, through the area surrounding the commutator 17, and out of the commutator end 13 of the motor.

Figure 2:
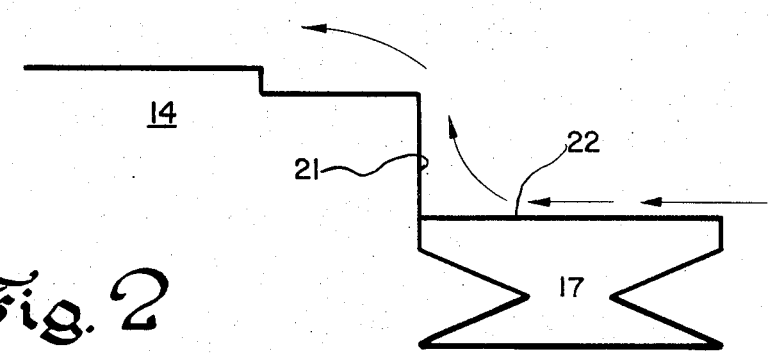
FIG. 2 is a schematic illustration of the air flow across the commutator surface of a conventional system.

A preferred ventilation system causes the air to flow in the opposite direction, to initially pass over the commutator 17 and subsequently over the larger diameter armature 14, as shown by the arrows in FIG. 2. A maximum volume of air at a high velocity is thus made to flow directly over the surface of the commutator 17 to dissipate the heat generated by brush friction and contact resistance losses as well as other commutation factors.

There are, however, specific motor application which do not lend themselves to such a ventilation scheme. One such application is that described in U.S. Pat. No. 3,035,652 referenced herein before, wherein a ventilation design such as that shown in FIG. 1 is desired. A unique application is made of the motor by using the stator 16 as a wheel hub of a vehicle (not shown), with the drive end 12 of the motor being securely fastened to the vehicle frame 15 by its stator 11 and drivably connected to the wheel 19 by its drive shaft 18 and associated gears (not shown). By placing the current collector assembly on the outboard side 13 of the wheel, maintenance and accessibility of this and other motor elements is facilitated, an important provision for a DC motor installation. The design does not, however, allow for conventional methods of introducing air to the motor for ventilation thereof.

The introduction of the coolant air from the drive end 12 of the motor, as shown in FIG. 1, brings about a flow pattern which adversely affects the cooling of the armature 17. Although the armature 14 and the stator coils 16 are adequately ventilated by a relatively smooth flow of air, the amount of heat dissipated from the armature under these conditions is considerably reduced from that dissipated in the conventional schemes of FIG. 2. The reduced diameter of the commutator 17 in respect to the armature introduces an abrupt change in the air channel. As the volume of the air space increases, the velocity decreases. More important, the pattern of air flow is unable to abruptly conform to the boundary surface defined by the commutator surface 22 and the riser surface 21. Instead, it follows a path similar to that shown by the arrows, thereby avoiding the proximity of the commutator surface 22 which is nearest the riser surface 21. The reduced volume of air which is brought into contiguity with that portion of the commutator has a reduced relative velocity, and consequently causes a decrease in the heat transfer from the commutator surface.

Figure 4:
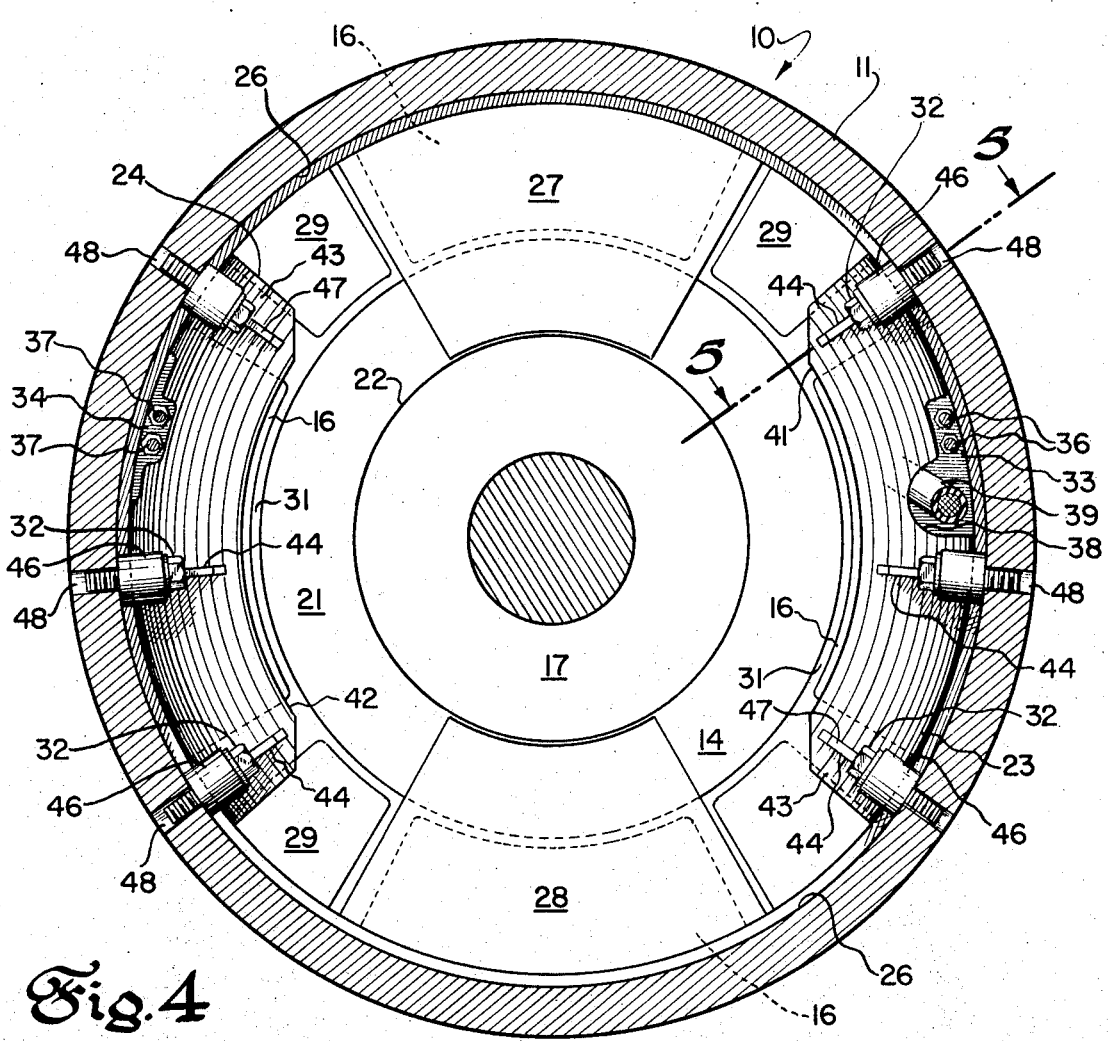
FIG. 4 is a rear sectional view thereof as seen along line 4—4 of FIG. 3.

FIG. 3 depicts a motor of the above type having air deflectors 23 and 24 designed for the purpose of avoiding the problem discussed hereinabove and forming the essence of this invention. The deflectors are secured to the inner wall of the stator in an axial position surrounding the riser portion of the rotor, such that the air flow pattern proximate the riser surface 21 is deflected radially inward toward the commutator surface 22. The velocity of the air flow relative to the commutator surface is thus increased with a consequent increase in heat transfer therefrom. Subsequent air movement takes place axially along the commutator surface to discharge at the commutator end 13 of the motor. As can be seen in FIGS. 3 and 4 the stator inner wall has a slightly enlarged portion 26 surrounding the commutator 17, its purpose being that of providing space for the brush and brushholder assemblies 27 and 28 disposed in diametric relationship as depicted in FIG. 4.

The type of motor shown is, a four pole DC motor having field windings 16 and commutation windings 29 radially spaced in the stator 11 with the armature 14 disposed concentrically to allow an air gap 31 therebetween.

In that enlarged 26 portion of the stator, is disposed the commutator 17 with its surface 22 engaged by the brush assemblies 27 and 28. The riser surface 21 forms the radial transition surface between the outer surface of the armature 14 and the commutation surface 22.

The baffles 23 and 24 are shown in their respective installed positions in FIGS. 3 and 4. They are concentrically secured to the inner wall enlarged portion 26 by a plurality of bolts 32 in an axial position such that they surround the riser surface portion 21 of the armature. An angle of approximately 90° is subtended by each of the annular baffles. The remaining portion of the circle is occupied by the brush assemblies 27 and 28, which extend axially toward the armature core 14 so as to interfere with the installation of a baffle extending completely around the commutator. Although an arc extension of 90° is not critical to the baffles in the preferred embodiment of this invention, this length is desirable in a four pole motor to facilitate installation and to allow sufficient room for the brushholder assemblies. Besides the mechanical consideration of space, creepage could also become a problem if the metal baffles are located too close to the brush assemblies.

Portions of the baffles 23 and 24 may be removed for purposes of extending other elements therethrough. The designs of FIG. 4 have formed therein the holes 33 and 34 in the outer edge of the baffles 23 and 24 respectively to allow the brakelines 36 and 37 to be passed therethrough. Baffle 23 also has formed therein a circular hole 38 for the passing of a cable 39 therethrough. The inner edges 41 and 42 of the baffles 23 and 24 have a profound effect on the air flow pattern and are preferably uniform with no indentions to disturb the smooth flow of air to the commutator surface.

The baffle profile as seen in FIG. 5 is concave with respect to the stator coils 16 and commutator 17. Various shapes and sizes may be effectively utilized while remaining within the intent of this invention; however, experimental tests have shown that the preferable design 15 of a substantially uniform curvature with a subtended arc of approximately 90° as illustrated in FIG. 5.

Extending normally outward from the rear wall 43 of the baffles are a plurality of gussets 44 (FIG. 4 and 5), secured thereto in a rigid manner such as by welding. Attached to each gusset is a cylindrical block 46 aligned radially with respect to the stator 11, and rigidly secured to the gusset rear edge 47 by welding or the like. The bolts 32 extend through the blocks 46 and screw into apertures 48 in the stator wall to hold the baffles in a fixed position.

Figure 6:
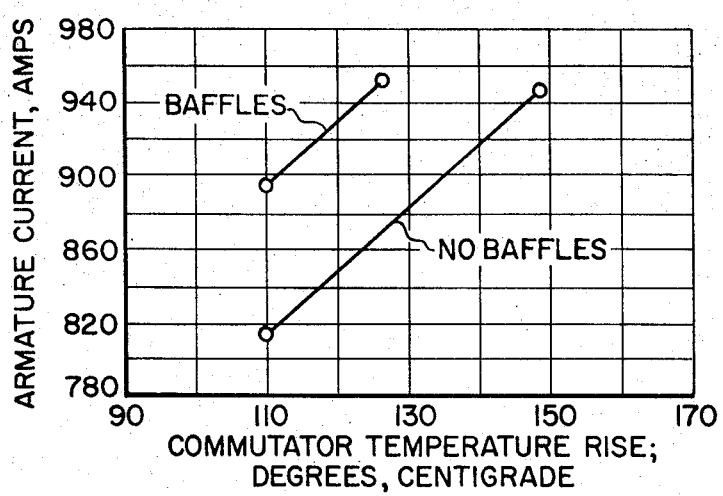
FIG. 6 illustrates performance curves of a motor with and without the baffles installed.

The effectiveness of the baffles is illustrated by FIG. 6 which compares a heat run, with no baffles, and a heat run with the baffles installed in accordance with the preferred embodiment. In each case a ventilation air flow of 160 lbs. of air/min. was forced through the motor. With an armature current of 950 amps, and a voltage of 570 volts, the commutator temperature rises were found to be 148° and 126° C, respectively. Prorating each to a temperature rise limit of 110° C to allow for a 40° C ambient temperature, the motor ratings are 817 amperes and 887 amperes respectively. Applied to the particular application on a motorized wheel a 15 percent reduction in temperature rise was effected by the use of the baffles, which produced an 8.6 percent increase in the motor rating.

What is claimed as new and desire to secure by Letters Patent of the United States is:

1. An improved powered wheel assembly of the type having a stator supported at its inner end by a vehicle frame, a rotor mounted in said stator with a commutator at the outer end thereof and a drive means at the inner end thereof, wheel means rotatably mounted on said stator and operably connected to said drive means, and ventilation means adapted to force air axially across said rotor from its drive end toward its commutator end, the improvement comprising:

baffle means mounted to said stator in an axial position proximately surrounding the inner end of said commutator so as to direct the flow of ventilating air radially inward toward said commutator and subsequently across its longitudinal length to cause increased heat transfer therefrom.

2. A powered wheel assembly as set forth in claim 1 wherein said baffle means comprises at least one annular baffle conforming to and secured to the inner surface of said stator.

3. A powered wheel assembly as set forth in claim 1 wherein the axial cross section of said baffle is concave in form with respect to the rotor.

4. A powered wheel assembly as set forth in claim 3 wherein said concave form is uniform in curvature and further wherein the are subtended thereby is approximately 90°.

5. A powered wheel assembly as set forth in claim 1 wherein said baffle means is secured to said stator by a plurality of radially aligned bolts.

6. A powered wheel assembly comprising:
   a. a stator supported at its inner end by a vehicle frame;
   b. a rotor mounted in said stator with a commutator at the outer end thereof and a drive means at the inner end thereof;
   c. ventilation means for forcing air axially across the outer periphery of said rotor from its drive end toward its commutator end; and
   d. baffle means mounted to said stator in an axial position prominately surrounding said commutator at its end adjacent said rotor so as to direct the flow of ventilating air radially inward toward said commutator and subsequently across its longitudinal length to cause increased heat transfer therefrom.

7. A powered wheel assembly as set forth in clam 6 wherein said baffle means comprises at least one annular baffle conforming to and secured to the inner surface of said stator.

8. A powered wheel assembly as set forth in claim 6 wherein the axial cross section of said baffle is concave in form with respect to the rotor.

9. A powered wheel assembly as set forth in claim 8 wherein said concave form is uniform in curvature and further wherein the arc subtended thereby is approximately 90°.

10. A powered wheel assembly as set forth in claim 6 wherein said baffle means is secured to said stator by a plurality of radially aligned bolts.

* * * * *